US006818051B2

(12) United States Patent
Anselmann et al.

(10) Patent No.: US 6,818,051 B2
(45) Date of Patent: Nov. 16, 2004

(54) PIGMENTS

(75) Inventors: Ralf Anselmann, Ramsen (DE);
Thomas Albrecht, Frankfurt (DE);
Sara Rodriguez-Mozaz, Pamplona (ES)

(73) Assignee: Merck GmbH, Darmstadt (DE)

( * ) Notice: Subject to any disclaimer, the term of this patent is extended or adjusted under 35 U.S.C. 154(b) by 0 days.

(21) Appl. No.: 10/276,228

(22) PCT Filed: Apr. 25, 2001

(86) PCT No.: PCT/EP01/04630
§ 371 (c)(1),
(2), (4) Date: Nov. 14, 2002

(87) PCT Pub. No.: WO01/88044
PCT Pub. Date: Nov. 22, 2001

(65) Prior Publication Data
US 2003/0116062 A1 Jun. 26, 2003

(30) Foreign Application Priority Data
May 18, 2000 (DE) ......................... 100 24 466

(51) Int. Cl.$^7$ ............................. C04B 14/00
(52) U.S. Cl. .............. 106/401; 106/434; 106/435; 106/446; 106/447; 106/454; 106/475
(58) Field of Search ............... 106/401, 435, 106/446, 447, 454, 475, 434; 501/86

(56) References Cited

U.S. PATENT DOCUMENTS 4,703,020 A * 10/1987 Nakano et al. .............. 501/86
4,911,903 A    3/1990 Klaus et al.
5,846,310 A   12/1998 Anselmann et al.

FOREIGN PATENT DOCUMENTS

EP          0 141 388 A     5/1985

OTHER PUBLICATIONS

Mayoral et al, 3D Long Range Ordering in an Silicon–dioxide Submicrometesphere Sinstered Superstructure,Advanced Materials, VCH, Verlagsgesellschaft, Weinheim, DE, Bd. 9, Nr. 3, Feb. 1, 1997, pp. 257–260, XP000682014.*
O. E. Rogach et al., "Self–Organization of Uniform Silica Globules Into the Three–Dimensional Superlattice of Artificial Opals," Materials Science and Engineering B, Elsevier Sequoia, Lausanne,CH, Bd. 64, Nr. 1., Sep. 15, 1999, pp. 64–67, XP004181584.
R. Mayoral et al., "$3^{rd}$ Long–Range Ordering In an SI02 Submicrometer–Shpere Sintered Superstructure," Advanced Materials, VCH, Verlagsgesellschaft, Weinheim, DE, Bd. 9, Nr. 3, Feb. 1, 1997, pp. 257–260, XP000682014.
Database WPI, Section CH, Week 199430, Derwent Publication Ltd., London, GB; AN 1994–24965, XP002175428 & WO 94 16123 A (Kommercheskii Tsentr WS Co. Ltd.), Jul. 21, 1994.

* cited by examiner

Primary Examiner—C. Melissa Koslow
Assistant Examiner—Shalie A Manlove
(74) Attorney, Agent, or Firm—Millen White Zelano & Branigan, P.C.

(57) ABSTRACT

The invention relates to particles with an opalescent effect, which have a particle size in the range from 5 μm to 5000 μm, comprising monodisperse spheres having a diameter of 50 nm to 2 μm with a standard deviation of less than 5% in a packed and regularly ordered structure which is three-dimensional in terms of domains and is mechanically stabilized by physical or chemical modification.

22 Claims, 2 Drawing Sheets

PIGMENTS

Figure 1:
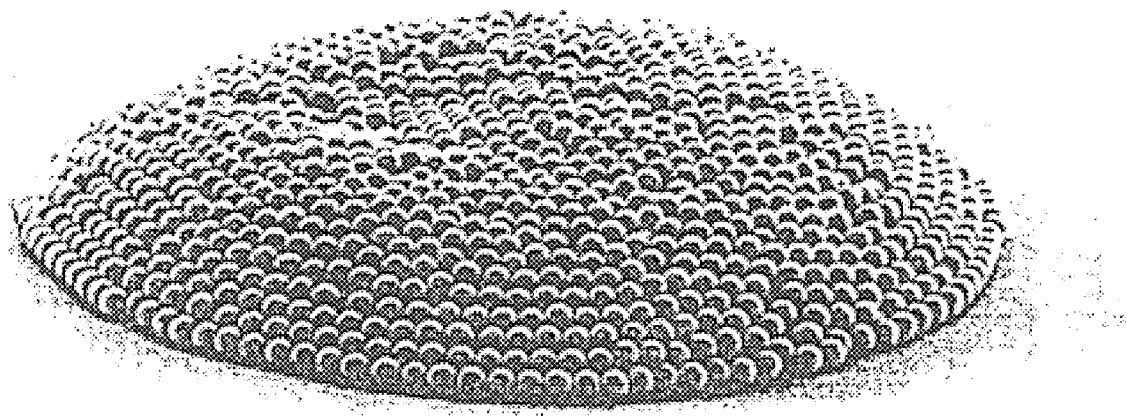

The invention relates to pigments, especially interference pigments, which are characterized by a three-dimensional periodic arrangement of monodisperse spheres in the nanometer range.

Natural precious opals comprise monodisperse, regularly arranged silica gel spherules with diameters of 150–400 nm. The colour play of these opals comes about by Bragg-like scattering of the incident light at the lattice planes of the spherules, with their crystalline arrangement.

There has been no lack of attempts to synthesize white and black opals for jewellery purposes, using waterglass or silicone esters as starting material.

U.S. Pat. No. 4,703,020 describes a process for producing a decorative material comprising amorphous silica spherules in three-dimensional, arrangement with zirconium oxide or zirconium hydroxide in the interstices between the spherules. The spherules have a diameter of 150–400 nm. Production takes place in two stages. In a first stage, silica spherules are caused to sediment from an, aqueous suspension. The resulting composition is then dried in air and subsequently calcined at 800° C.

In a second stage, the calcined material is introduced into the solution of a zirconium alkoxide, with the alkoxide penetrating into the interstices between the spheres and with zirconium oxide being precipitated by hydrolysis. This material is then calcined at 1000–1300° C.

In comparison to a natural opal, the material obtained possesses zirconium dioxide in the voids between the individual spheres.

The material is given mechanical stability firstly by inclusion of the zirconium oxide and also, very substantially, by the calcining, which, as is known, modifies the physical and chemical structure of the material. The production process described here has the disadvantage that the material has to be calcined a number of times at high temperatures. It is, consequently, a very energy-consuming process.

It was an object of the present invention to avoid the abovementioned disadvantages. The intention was in particular to provide a particulate material which exhibits opalescent effects similar to those of natural opal while having sufficient mechanical stability. A further object of the invention was to provide a preparation process for such a material that allows defined particles suitable for use as pigments to be obtained with optimized energy consumption.

The present invention therefore first provides particles with an opalescent effect, which have a particle size in the range from 5 $\mu$m to 5000 $\mu$m, the particles comprising monodisperse spheres having a diameter of 50 nm–2 $\mu$m with a standard deviation of less than 5% in a three-dimensional, regularly ordered structure which is closely packed in terms of domains and is mechanically stabilized by physical or chemical modification.

The present invention further provides a process for preparing particles, where, in one step a) monodisperse spheres having a diameter of 50 nm to 2 $\mu$m with a standard deviation of less than 5% are suspended in a liquid medium, b) the suspension is applied to a surface, and c) the liquid medium is removed.

The invention further provides for the use of the particles of the invention as pigments especially in paints, varnishes, printing inks, plastics, ceramic materials, glasses and cosmetic formulations. For this purpose they may also be used together with customary commercial pigments, examples being organic and inorganic absorption pigments, metal effect pigments and LCP pigments. Furthermore, the particles of the invention are also suitable for producing pigment preparations and for producing dry preparations, such as granules, for example.

With the particles of the invention, the three-dimensionally packed and regularly ordered structure is particularly important for achieving the opalescent effect. Normally, this three-dimensionally packed and regularly ordered structure is not a perfect order extending over the entire particle. For achieving the desired colour effects, it is sufficient for the particles of the invention to have individual domains within which there is a uniform arrangement. For the explanation of this structure, reference may be made in particular to FIGS. 1 and 2, which show precisely the presence of ordered domains of monodisperse spheres and yet at the same time show that in this case there is by no means close, let alone very close, spherical packing for the particle as a whole.

Also important for the particles of the invention with opalescent effect is the physical or chemical modification for mechanical stabilization, since without such stabilization the particles would not be fixed in their three-dimensional form. Nevertheless, the modification cannot be made by just any mode of mechanical stabilization, since otherwise the opalescent effect, as already explained above, would be impaired. The difference in refractive index between the spheres and the material in the interstices critically influences the optical properties of the particles. Therefore, preference is given to those physical or chemical modifications which make it possible to maintain an appropriate difference in refractive index. In principle, the effects according to the invention may be observed with differences in refractive index in the range from about 0.01 to about 2. The optimum difference in refractive index for opalescent pigments is in the range from about 0.1 to 0.6, although much smaller or even larger differences in refractive index are suitable for exhibiting opalescent effects. With small differences in refractive index, such as from about 0.01 to about 0.02, the particles-are substantially transparent and therefore show particularly pronounced opalescent effects owing to the many effective reflection planes. Because of the transparency, however, the intensity of these effects is weak.

The monodisperse spheres used, including any coatings that may be present, possess a diameter in the range from 50 nm to 2 $\mu$m, preference being given to the use of spheres having a diameter of 150–1500 nm. Particular preference is given to using spheres in the range from 200–500 nm, since with particles in this order of magnitude the reflections of different wavelengths of visible light differ distinctly from one another and, accordingly, the opalescence occurs to a particularly pronounced extent in a variety of colours. In one variant of the present invention, however, it is also preferred to use multiples of this preferred particle size, which then result in reflections corresponding to the higher orders, and thus in a broad play of colour.

The monodisperse spheres may comprise almost any materials which are sufficiently transparent for the wavelengths of the desired light reflections, so that this light is able to penetrate several sphere diameters deep into the particle. Preferred spheres comprise metal chalcogenides, preferably metal oxides or metal pnictides, preferably nitrides or phosphides. Metals in the sense of these terms are all elements which may occur as an electropositive partner in comparison to the counterions, such as the classic metals of the transition groups and the main group metals of main groups one and two, but also including all elements of main group three and also silicon, germanium, tin, lead, phosphorous, arsenic, antimony and bismuth. The preferred metal chalcogenides and metal pnictides include, in particular, silicon dioxide, aluminum oxide, titanium dioxide, zirconium dioxide, gallium nitride, boron nitride and aluminum nitride and also silicon nitride and phosphorous nitride.

Starting material for the production of the particles of the invention preferably comprises monodisperse spheres of silicon dioxide which are obtainable, for example, by the process described in U.S. Pat. No. 4,911,903. The spheres are produced by hydrolytic polycondensation of tetraalkoxysilanes in an aqueous-ammoniacal medium, a sol of primary particles being produced first of all and then the $SiO_2$ particles obtained being brought to the desired particle size by continuous, controlled addition of tetraalkoxysilane. With this process it is possible to produce monodisperse $SiO_2$ spheres having average particle diameters of between 0.05 and 10 μm with a standard deviation of 5%.

Further preferred starting material comprises $SiO_2$ spheres coated with nonabsorbing metal oxides, such as $TiO_2$, $ZrO_2$, $ZnO_2$, $SnO_2$ or $Al_2O_3$, for example. The production of $SiO_2$ spheres coated with metal oxides is described in more detail in U.S. Pat. No. 5,846,310, DE 198 42 134 and DE 199 29 109, for example. Coating with absorbing metal oxides, such as the iron oxides $Fe_3O_4$ and/or $Fe_2O_3$, also leads to particles which may be used in accordance with the invention.

As starting material it is also possible to use mondisperse spheres of nonabsorbing metal oxides such as $TiO_2$, $ZrO_2$, $ZnO_2$, $SnO_2$ or $Al_2O_3$ or metal oxide mixtures. Their preparation is described, for example, in EP 0 644 914. Furthermore, the process according to EP 0 216 278 for producing monodisperse $SiO_2$ spheres may be transferred readily and with the same result to other oxides. To a mixture comprising alcohol, water and ammonia, whose temperature is set precisely using a thermostat to 30–40° C., tetraethoxysilane, tetrabutoxytitanium, tetrapropoxyzirconium or mixtures thereof are added in one shot with intensive mixing and the resulting mixture is stirred intensively for a further 20 seconds, forming a suspension of monodisperse spheres in the nanometer range. Following a post-reaction period of from 1 to 2 hours, the spheres are separated off in a conventional manner, by centrifuging, for example, and are washed and dried.

Monodisperse polymer spheres as well, for example polystyrene or polymethyl methacrylate, may be used as starting material for the production of the particles of the invention. Spheres of this kind are available commercially. Bangs Laboratories Inc. (Carmel, USA) offer monodisperse spheres of a very wide variety of polymers.

Further suitable starting material for producing the pigments of the invention comprises monodisperse spheres of polymers which contain included particles, for example metal oxides. Such materials are offered by the company micro caps Entwicklungs- und Vertriebs GmbH in Rostock, Germany. In accordance with customer-specific requirements, microencapsulations are manufactured on the basis of polyesters, polyamides and natural and modified carbohydrates.

It is further possible to use monodisperse spheres of metal oxides coated with organic materials, for example silanes. The monodisperse spheres are dispersed in alcohols and modified with common organoalkoxysilanes. The silanization of spherical oxide particles is also described in DE 43 16 814.

The pigment particles produced from the monodisperse spheres and having an average particle size of 5 μm-5 mm preferably possess a platelet-shaped structure.

Figure 2:
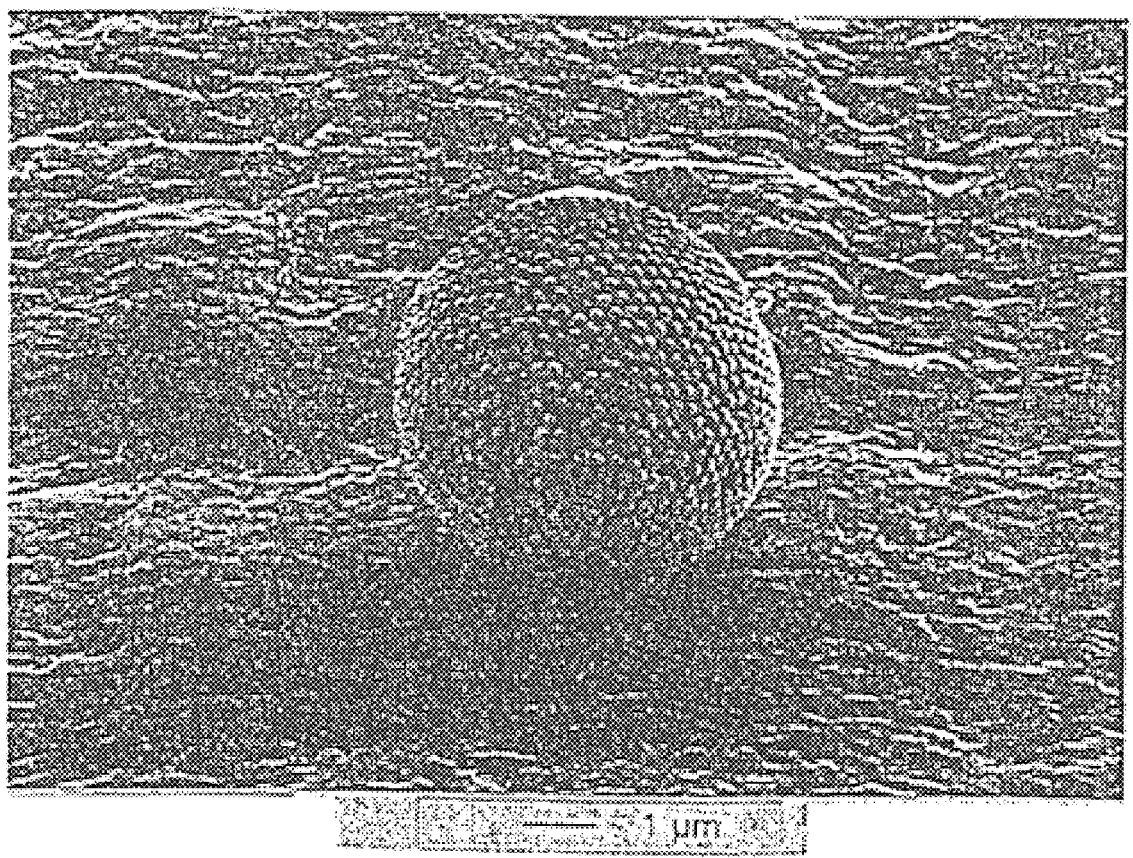

A platelet-shaped particle of this kind is depicted in FIG. 1. In another preferred embodiment of the present invention, the particles possess a virtually spherical three-dimensional form, as shown in FIG. 2. Here as well, the average particle size is usually in the range from 5 μm to 5 mm. This embodiment possesses the advantage that the pigments have no preferential direction. Consequently, when processed for example by polymer injection moulding, no streaks are formed as a result of preferential orientations of the pigments in the matrix.

The pigments of the invention may be produced in accordance with 2 alternative processes. In the case of the droplets process, the monodisperse spheres are suspended in a liquid medium in a concentration of preferably 1–35% by weight. The suspension is sprayed so that, on a surface, drops are formed.

Subsequently, the liquid medium is removed in such a way, preferably by drying under mild conditions, that the spheres order themselves partially.

In this context it is important that, on a smooth surface, the suspension is sprayed in such a way as to form individual drops which do not coalesce. Important for the shape of the particles formed is the wettability of the surface by the dispersion medium used. If the wetting tension is positive, i.e. the contact angle (regarding, the definition of the contact angle see, for example, Dörfler, Grenzflächen- und Kolloidchemie, VCH 1994, page 34) is less than 90°, then the surface is said to be wetted by the liquid. In this case, the spherules in the drop are transported by capillary forces to the edge of the drop, resulting in the preferential formation of annular structures which are poorly suited to use as pigment particles. In order to form inventively preferred, compact, platelet-like, lens-shaped or seven spherical particles, however, the surface should not be wetted, or should not be completely wetted, i.e. the wetting tension is negative and the contact angle, therefore, is greater than 90° (cf. FIGS. 1 and 2). The precise shape of the particles is also influenced by the concentration of the suspension, the initial drop diameter, the rate of drying, and the interaction between the suspended spherules and the surface.

Following the removal of the liquid medium in step c), the particles are then detached from the surface by a dry or wet method in a subsequent step d).

If the surface is smooth, particles having a preferential orientation are formed, in which identical reflection planes are at the same time in reflection position. Particularly intense reflections may be obtained in this way. Consequently, in one inventively preferred embodiment, the surface in question is a smooth surface.

Particles of particularly good quality may be obtained if the droplets are applied monodispersely. Dispersion media which may be used to disperse the monodisperse spheres include readily evaporable solvents, examples being alcohols, low alkanes, mixtures of organic solvents, and also water and solvent/water mixtures.

The preferably smooth surface onto which the droplets are sprayed may comprise glass, metal or plastic. A continuous strip of a heat-stable plastic or a metal, specifically stainless steel, is particularly suitable. Suitable plastics materials are polyethylene terephthalate, other polyesters, polyacrylates and, in particular, polytetrafluoroethylene.

As the spraying equipment it is possible, for example, to use modified ink-jet printers. The drops applied to the surface by spraying are dimensioned in accordance with the use of the pigment.

The drying of the droplets may be accelerated by supplying heat. Where a continuous strip is used, it is guided, together with the spray-applied drops, through a drying zone, which may comprise one or more sections. One preferred embodiment of the drying zone has a drying means in which drying is carried out using an IR dryer.

The individual particles formed, which are shown in FIG. 1 and FIG. 2 (recorded using a scanning electron microscope), may be separated from the smooth surface by means of a device. Separation may either be effected mechanically, by scrapers or brushes, or in a non-contact fashion by releasing a release layer or by means of ultrasound. Separation with a jet of liquid or of gas has proved to be advantageous.

An alternative process for producing the pigments of the invention with opal structure is continuous strip coating. A suspension of the monodisperse spheres, instead of being sprayed to form individual drops, is deposited in the form of a film of liquid on a support and, following sedimentation, drying and solidification, is comminuted into platelets of appropriate size. EP 0 608 388 describes the production of platelet-shaped pigments using a continuous strip process.

The process of the invention, especially in this embodiment, may also be used for the coating, and in particular the painting, of surfaces. Consequently, this use is also provided for by the present invention.

The continuous strip, which is guided over a system of rollers, passes through an application zone, where it is coated with a thin film of the dispersion of the monodisperse spheres in a solvent or water. The dispersion is applied in accordance with known methods by way of a roll system or a nozzle. This nozzle may be designed as a single-fluid or multi-fluid nozzle. In addition, in order to establish the thickness of the applied film, a variable diaphragm or an airbrush, in which a sharp jet of air is blown through a slit die, may be provided.

The coated strip is subsequently likewise passed through a drying zone. The coat which is formed is subsequently separated from the strip by means of a device. Separation may take place either mechanically by scrapers or brushes or contactlessly by release of a release layer, or by means of ultrasound. Separation using a liquid jet or gas jet has proved to be advantageous.

It is judicious to strengthen the opal structure by mechanically stabilizing the particles prior to their detachment from the surface, so as to ensure the required mechanical stability of the pigment particles. This stabilization may be carried out by means of the following physical and chemical measures.

The surface of the spheres is modified in order to effect crosslinking of the spheres during the formation of the opal structure or a better adhesion of the spheres to one another. To suspend the spheres in a liquid medium, it is possible preferably to add a compound which is hydrolysable in water and whose hydrolysis product deposits on the spheres in the course of the formation of the opal structure and brings about chemical bonding of the spheres to one another. In the case of silicon dioxide spheres, preferably tetraethyl orthosilicate is added to the suspension at temperatures of from 50 to 80° C.; it hydrolyses to silicon dioxide and leads to chemical bonding of the spheres to one another. Alternatively, silicon tetrachloride may be used to treat the coated surface.

The particles of the invention may also be chemically stabilized by adding soluble silicates, examples being sodium silicate and/or polymerizable soluble aluminum compounds, to the suspension.

Stabilization, may also be achieved by treating the coated surface with soluble silicates. It is also possible to stabilize the particles physically by embedding them in transparent plastics or appropriate coating materials. In this case it is important that the embedding material is transparent and has a suitable refractive index which leads to an optimum difference in refractive index. For ease of processing of the embedding material, a coating material, for example, it is particularly advantageous for the material in question to be of low viscosity and to undergo little or no change in its volume in the course of curing. In one possible embodiment, the embedding material or its precursor is already present in the suspension in an appropriate volume fraction.

In a further embodiment of the strengthening of the opal structure, the surface of the spheres is modified with silanes which are then crosslinked with one another, during the formation of the opal structure, by means of heat or UV radiation. This crosslinking likewise leads to a strengthening of the opal structure. The silanization of monodisperse silicon dioxide spheres is described in more detail in DE 43 16 814.

The pigment of the invention may be used for pigmenting varnishes, powder coating materials, paints, printing inks, plastics and cosmetic formulations, such as lipsticks, nail varnishes, cosmetic sticks, compact powders, foundation, shampoos, and also loose powders and gels, for example.

The concentration of the pigment in the application system intended for pigmentation is generally between 0.1 and 70% by weight, preferably between 0.1 and 50% by weight, and in particular between 1.0 and 20% by weight, based on the total solids content of the system. It is generally dependent on the specific application.

Plastics comprise the pigment of the invention customarily in amounts of from 0.01 to 50% by weight, preferably from 0.01 to 25% by weight, in particular from 0.1 to 7% by weight, based on the mass of the plastic.

In the coatings sector, the pigment mixture is used in amounts of from 0.1 to 30% by weight, preferably from 1 to 10% by weight, based on the coatings dispersion.

In the case of the pigmentation of binder systems for paints, for example, and printing inks for gravure, offset or screen printing, or as a precursor for printing inks, for example in the form of highly pigmented pastes, granules, pellets, etc., pigment mixtures with spherical colorants, such as $TiO_2$, carbon black, chromium oxide, iron oxide, and also organic colour pigments, for example, have proved to be particularly suitable. The pigment is generally incorporated in the printing ink in amounts of 2–35% by weight, preferably 5–25% by weight, and in particular 8–20% by weight. Offset printing inks may comprise the pigment in amounts of up to 40% by weight or more. The precursors for printing inks, in the form of granules, as pellets, briquettes, etc., for example, comprise in addition to the binder and additives up to 95% by weight of the pigment of the invention. The invention therefore additionally provides formulations which comprise the pigment of the invention.

The examples below are intended to illustrate the invention without limiting it.

EXAMPLE 1

0.29 g of monodisperse $SiO_2$ spheres having a diameter of 250 nm is dispersed in 50 ml of ethanol, and 19 ml of deionized water and 12 ml of 25% ammonia are added to this dispersion. The suspension is heated to 70° C. with intensive stirring and 0.2 ml of tetraethyl orthosilicate is added dropwise. The suspension is transferred to a Petri dish and the liquid phase is left to evaporate at 70° C. Removal of the residue by scraping gives a white powder having an opalescent effect, the perceived reflection colour being angle-dependent.

EXAMPLE 2

Following the addition of the tetraethyl orthosilicate, the suspension prepared in accordance with Example 1 is cooled to 23° C. and applied using an airbrush to a hydrophobic silicon wafer. The drops are dried at 23° C. in a stream of argon. The residue is flushed from the substrate with water, separated off on a filter and dried at 110° C.

EXAMPLE 3

An aqueous suspension (16% by weight) of monodisperse $SiO_2$ spheres having a diameter of 250 nm is applied by spraying with an airbrush at 23° C. to a Teflon surface. The drops are left to dry. The coated Teflon surface is subsequently transferred to a closed vessel in which there is an atmosphere of argon and silicon tetrachloride. Following a brief exposure period, a residue thus treated is flushed from the Teflon surface with water, separated off on a filter and dried at 110° C.

What is claimed is:

1. Particles with an opalescent effect, which have a particle size of 5 μm to 5000 μm, comprising monodisperse polymer spheres having a diameter of 50 nm 2 μm with a standard deviation of less than 5% in a closely packed and regularly ordered structure which is three-dimensional in terms of domains and is mechanically stabilized by physical or chemical modification.

2. Particles with an opalescent effect, which have a particle size in the range from 5 μm to 5000 μm, comprising monodisperse surface modified metal oxide or metal pnictide spheres having a diameter of 50 nm to 2 μm with a standard deviation of less than 5% in a closely packed and regularly ordered structure which is three-dimensional in terms of domains and is mechanically stabilized by physical or chemical modification, said spheres optionally being additionally coated wit metal chalcogenide, metal pnictide or organic polymer.

3. Particles with an opalescent effect, which have a particle size in the range from 5 μm to 5000 μm, comprising monodisperse surface modified metal chalcogenide spheres having a diameter of 50 nm to 2 μm with a standard deviation of less than 5% in a closely packed and regularly ordered structure which is three-dimensional in terms of domains and is mechanically stabilized by physical or chemical modification.

4. Particles according to claim 3, the monodisperse spheres coated with a copolmer.

5. Particles according to claim 1, the monodisperse polymer spheres further comprising a metal oxide, and having a modified surface.

6. In varnishes, powder coatings, paints, printing inks, plastics or cosmetic formulations comprising a pigment, the improvement wherein the pigment is one according to claim 3.

7. A process for preparing particles according to claim 3, comprising
   a) suspending monodisperse spheres having a diameter of 50 nm 2 μm with a standard deviation of less than 5% in a liquid medium,
   b) applying the suspension to a surface, and
   c) removing the liquid medium.

8. A process for coating or painting surfaces, comprising applying to said surfaces a composition according to claim 3.

9. A process according to claim 7, further comprising (d) detaching the particles from the surface by dry or wet means.

10. A process according to claim 7, further comprising, subsequent to (c), physically or chemically stabilizing a structure formed in (c).

11. A process according to claim 7, wherein the surface of the spheres has been modified chemically to mechanically stabilize the particles.

12. A process according to claim 7, where a compound which is hydrolyzable in water, is added to the suspension of the spheres.

13. A process according to claim 7, where interstices between the spheres are subsequently filled with a transparent material.

14. Particles according to claim 2, wherein the monodisperse spheres are coated with nonabsorbing metal chalcogenide.

15. Particles according to claim 3, wherein the monodisperse spheres comprise silicon dioxide.

16. Particles according to claim 5, wherein the monodisperse spheres have a surface modified by at least one silane.

17. Particles according to claim 15, wherein the monodisperse spheres have a surface modified by at least one silane.

18. Process according to claim 9, wherein the structure formed in (c) is physically or chemically stabilized prior to detachment.

19. A process according to claim 12, wherein the compound hydrolyzable in water is an alkoxide.

20. A process according to claim 12, wherein the compound hydrolyzable in water is an tetraethoxysilicate.

21. Particles according to claim 3, wherein the spheres are surface modified with at least one silane.

22. A process for preparing particles, comprising
   a) suspending monodisperse spheres having a diameter of 50 nm to 2 μm with a standard deviation of less than 5% in a liquid medium,
   b) applying the suspension to a surface, and
   c) removing the liquid medium
   d) detaching the particles from the surface by dry or wet means.

* * * * *

UNITED STATES PATENT AND TRADEMARK OFFICE
CERTIFICATE OF CORRECTION

PATENT NO. : 6,818,051 B2
DATED : November 16, 2004
INVENTOR(S) : Ralf Anselmann It is certified that error appears in the above-identified patent and that said Letters Patent is hereby corrected as shown below:

<u>Column 7,</u>
Line 36, reads "wit" should read -- with --
Line 47, reads "copolmer" should read -- polymer --

Signed and Sealed this

Tenth Day of May, 2005

JON W. DUDAS
*Director of the United States Patent and Trademark Office*